United States Patent
Rigazio et al.

(10) Patent No.: US 7,729,909 B2
(45) Date of Patent: Jun. 1, 2010

(54) BLOCK-DIAGONAL COVARIANCE JOINT SUBSPACE TYING AND MODEL COMPENSATION FOR NOISE ROBUST AUTOMATIC SPEECH RECOGNITION

(75) Inventors: Luca Rigazio, Santa Barbara, CA (US); David Kryze, Santa Barbara, CA (US); Keiko Morii, Kanagawa (JP); Nobuyuki Kunieda, Kanagawa (JP); Jean-Claude Junqua, Santa Barbara, CA (US)

(73) Assignee: Panasonic Corporation, Osaka (JP)

( * ) Notice: Subject to any disclaimer, the term of this patent is extended or adjusted under 35 U.S.C. 154(b) by 1122 days.

(21) Appl. No.: 11/369,938

(22) Filed: Mar. 6, 2006

(65) Prior Publication Data
US 2007/0208560 A1    Sep. 6, 2007

Related U.S. Application Data

(60) Provisional application No. 60/659,054, filed on Mar. 4, 2005.

(51) Int. Cl.
G10L 15/20 (2006.01)
G10L 15/06 (2006.01)

(52) U.S. Cl. .................. 704/233; 704/243; 704/256.2

(58) Field of Classification Search .............. 704/233, 704/243, 244, 245, 256.2, 256.3
See application file for complete search history.

(56) References Cited

U.S. PATENT DOCUMENTS

| | | | | |
|---|---|---|---|---|
| 5,027,408 A * | 6/1991 | Kroeker et al. | ............. | 704/254 |
| 5,167,004 A * | 11/1992 | Netsch et al. | ............. | 704/200 |
| 5,487,129 A * | 1/1996 | Paiss et al. | ............. | 704/233 |
| 5,742,694 A * | 4/1998 | Eatwell | ............. | 381/94.2 |
| 5,745,382 A * | 4/1998 | Vilim et al. | ............. | 706/16 |
| 5,960,397 A * | 9/1999 | Rahim | ............. | 704/244 |
| 5,999,899 A * | 12/1999 | Robinson | ............. | 704/222 |
| 6,430,528 B1 * | 8/2002 | Jourjine et al. | ............. | 704/200 |
| 6,513,004 B1 * | 1/2003 | Rigazio et al. | ............. | 704/254 |
| 6,526,379 B1 * | 2/2003 | Rigazio et al. | ............. | 704/245 |
| 6,529,872 B1 * | 3/2003 | Cerisara et al. | ............. | 704/250 |
| 6,580,814 B1 * | 6/2003 | Ittycheriah et al. | ............. | 382/115 |
| 6,591,235 B1 * | 7/2003 | Chen et al. | ............. | 704/236 |
| 6,658,385 B1 * | 12/2003 | Gong et al. | ............. | 704/244 |
| 6,687,672 B2 * | 2/2004 | Souilmi et al. | ............. | 704/237 |
| 6,691,090 B1 * | 2/2004 | Laurila et al. | ............. | 704/250 |
| 6,691,091 B1 * | 2/2004 | Cerisara et al. | ............. | 704/255 |
| 6,915,259 B2 * | 7/2005 | Rigazio et al. | ............. | 704/244 |

(Continued)

OTHER PUBLICATIONS

Liu et al., "Model complexity control and compression using discriminative growth functions," Proceeding IEEE International Conference on Acoustics, Speech and Signal Processing, May 17-24, 2004, vol. 1, pp. 797-800.*

(Continued)

*Primary Examiner*—Martin Lerner
(74) *Attorney, Agent, or Firm*—Harness, Dickey & Pierce, P.L.C.

(57) ABSTRACT

Model compression is combined with model compensation. Model compression is needed in embedded ASR to reduce the size and the computational complexity of compressed models. Model-compensation is used to adapt in real-time to changing noise environments. The present invention allows for the design of smaller ASR engines (memory consumption reduced to up to one-sixth) with reduced impact on recognition accuracy and/or robustness to noises.

29 Claims, 4 Drawing Sheets

U.S. PATENT DOCUMENTS

| | | | |
|---|---|---|---|
| 6,980,952 B1* | 12/2005 | Gong | 704/234 |
| 6,983,264 B2* | 1/2006 | Shimizu | 706/22 |
| 7,197,456 B2* | 3/2007 | Haverinen et al. | 704/233 |
| 7,379,868 B2* | 5/2008 | Reynolds | 704/243 |
| 7,426,464 B2* | 9/2008 | Hui et al. | 704/227 |
| 7,499,857 B2* | 3/2009 | Gunawardana | 704/255 |
| 7,562,013 B2* | 7/2009 | Gotanda et al. | 704/228 |
| 2002/0165712 A1* | 11/2002 | Souilmi et al. | 704/233 |
| 2003/0033143 A1* | 2/2003 | Aronowitz | 704/233 |
| 2004/0181408 A1* | 9/2004 | Acero et al. | 704/255 |
| 2004/0199384 A1* | 10/2004 | Hong | 704/233 |
| 2005/0004795 A1* | 1/2005 | Printz | 704/222 |
| 2005/0060142 A1* | 3/2005 | Visser et al. | 704/201 |
| 2006/0015331 A1* | 1/2006 | Hui et al. | 704/227 |
| 2007/0033028 A1* | 2/2007 | Yao | 704/233 |

OTHER PUBLICATIONS

Ramaswamy et al., "Compression of acoustic features for speech recognition in network environments," Proceedings International Conference on Acoustics, Speech and Signal Processing, May 12-15, 1998, vol. 2, pp. 977-980.*

* cited by examiner

BLOCK-DIAGONAL COVARIANCE JOINT SUBSPACE TYING AND MODEL COMPENSATION FOR NOISE ROBUST AUTOMATIC SPEECH RECOGNITION

CROSS-REFERENCE TO RELATED APPLICATIONS

This application claims the benefit of U.S. Provisional Application No. 60/659,054, filed on Mar. 4, 2005. The disclosure of the above application is incorporated herein by reference in its entirety for any purpose.

FIELD OF THE INVENTION

The present invention generally relates to automatic speech recognition, and relates in particular to noise robust automatic speech recognition.

BACKGROUND OF THE INVENTION

Embedded noise robust automatic speech recognition (ASR) systems need to conserve memory due to the small size and limited resources of devices such as cell phones, car navigation, digital TVs, and home appliances. However, ASR systems are notorious for consuming large amounts of computational resources, including Random Access Memory (RAM). This tendency of ASR systems can be especially problematic in embedded devices that also need to allocate such resources for other functions that often need to run concurrently with ASR functions. Yet, reducing the amount of memory consumed by a noise robust ASR heavily impacts recognition accuracy and/or robustness to noise.

Referring to FIG. 1, model domain methods try to improve the performance of pattern matching by modifying the acoustic models so that they are adapted to the current noise level, while leaving the input signal 100 unchanged. In particular, a noise estimation module 104 estimates noise in the input signal 100, and model compensation module 106 adjusts the acoustic models 108 based on these noise estimates. Then, extracted features obtained from the unmodified input signal 100 by feature extraction module 102 are pattern matched to the adjusted acoustic models 108 by pattern matching module 110 to achieve recognition 112.

What is needed is a way to reduce the memory requirements of embedded noise robust ASR systems with reduced impact on recognition accuracy and/or robustness to noise. The present invention fulfills this need by making several changes to a noise robustness system employing a model domain method.

SUMMARY OF THE INVENTION

In accordance with the present invention, model compression is combined with model compensation. Model compression is needed in embedded ASR to reduce the size and the computational complexity of compressed models. Model-compensation is used to adapt in real-time to changing noise environments. The present invention allows for the design of smaller ASR engines (memory consumption reduced to up to one-sixth) with reduced impact on recognition accuracy and/or robustness to noises.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

In some embodiments, the present invention combines sub-space tying for model compression with alpha-Jacobian model-compensation for noise robustness to achieve a compact noise robust speech recognition system. Unfortunately this combination cannot be accomplished directly as the subspace tying structure does not allow for model-compensation. This difficulty arises because the distortion function used in model compensation requires a full space transformation (full dimensionality) of the acoustic models that invalidates the tying structure.

One area of interest in the present invention is the present solution to this issue. Specifically, a model compensation distortion function is designed that does not invalidate the tying structure, thus allowing for the coexistence of subspace tying and model-compensation. The design of the model compensation distortion function can be accomplished by making several changes in a noise robust ASR system to the following modules: (a) front-end analysis: the front-end whitening matrix can be block-diagonal to isolate a set independent subspaces (block-diagonal covariance matrix); (b) model-compensation: the model-compensation distortion function can be operating independently on the same subspaces identified by the front-end analysis (and cannot be a full-space transformation); and (c) subspace model compression: the subspaces used for the tying can be aligned with the independent subspaces defined in the front-end.

One ingredient of this method can be in the definition of the subspaces corresponding to the block-diagonal whitening matrix in the front-end. These subspaces need to be large enough to allow a good coverage of the speech signal correlation structure in the front-end and in the model-compensation step, but small enough to allow a low distortion error from the subspace tying step. In general, the subspace definition is an NP-Complete problem for which there is no computable exact solution, but for which an interactive converging algorithm can be provided.

The whitening matrix or matrices can take various forms depending on the characteristics of the independent subspaces. For example, in some embodiments, the independent subspaces can span over different time frames, and the whitening matrices include decorrelation across a 2-dimensional time-frequency axis. Also, in additional or alternative embodiments, such 2-D decorrelation matrices are decomposable as discrete cosine transform in the frequency domain and time derivative in the time domain.

Figure 1:
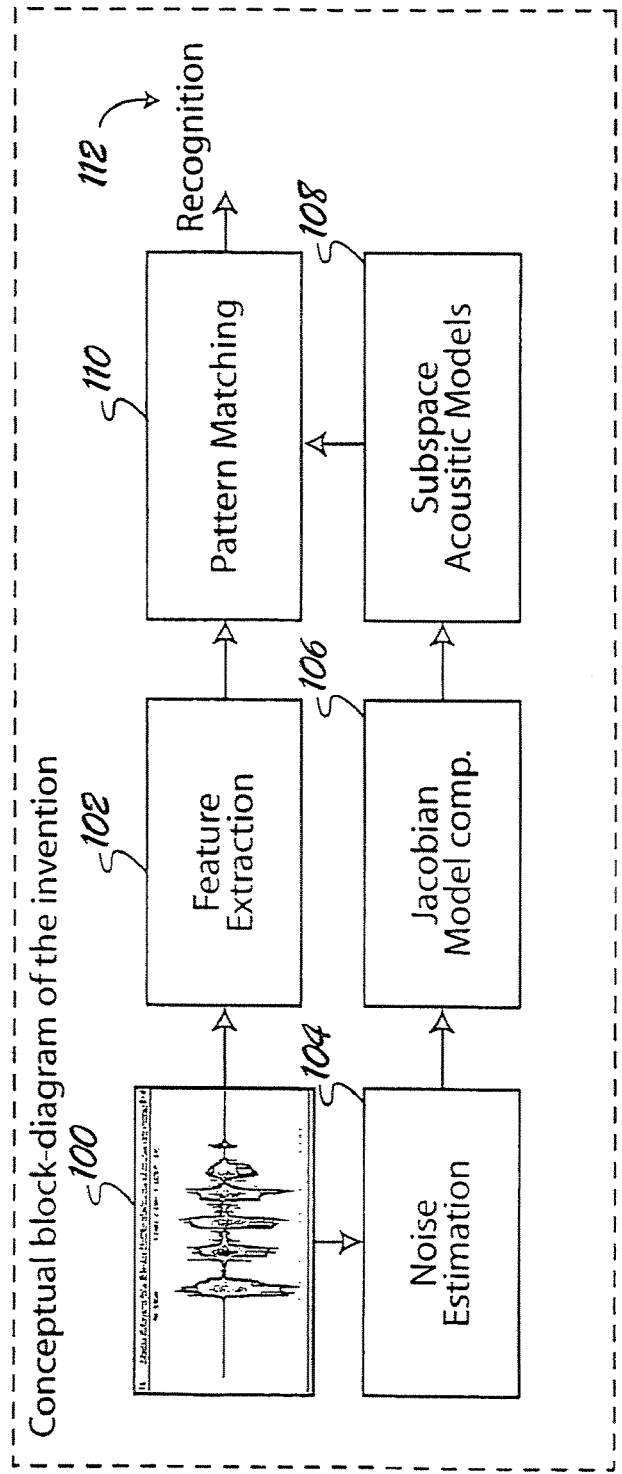
FIG. 1 is a block diagram illustrating a noise robust ASR system according to the prior art.
Figure 2:
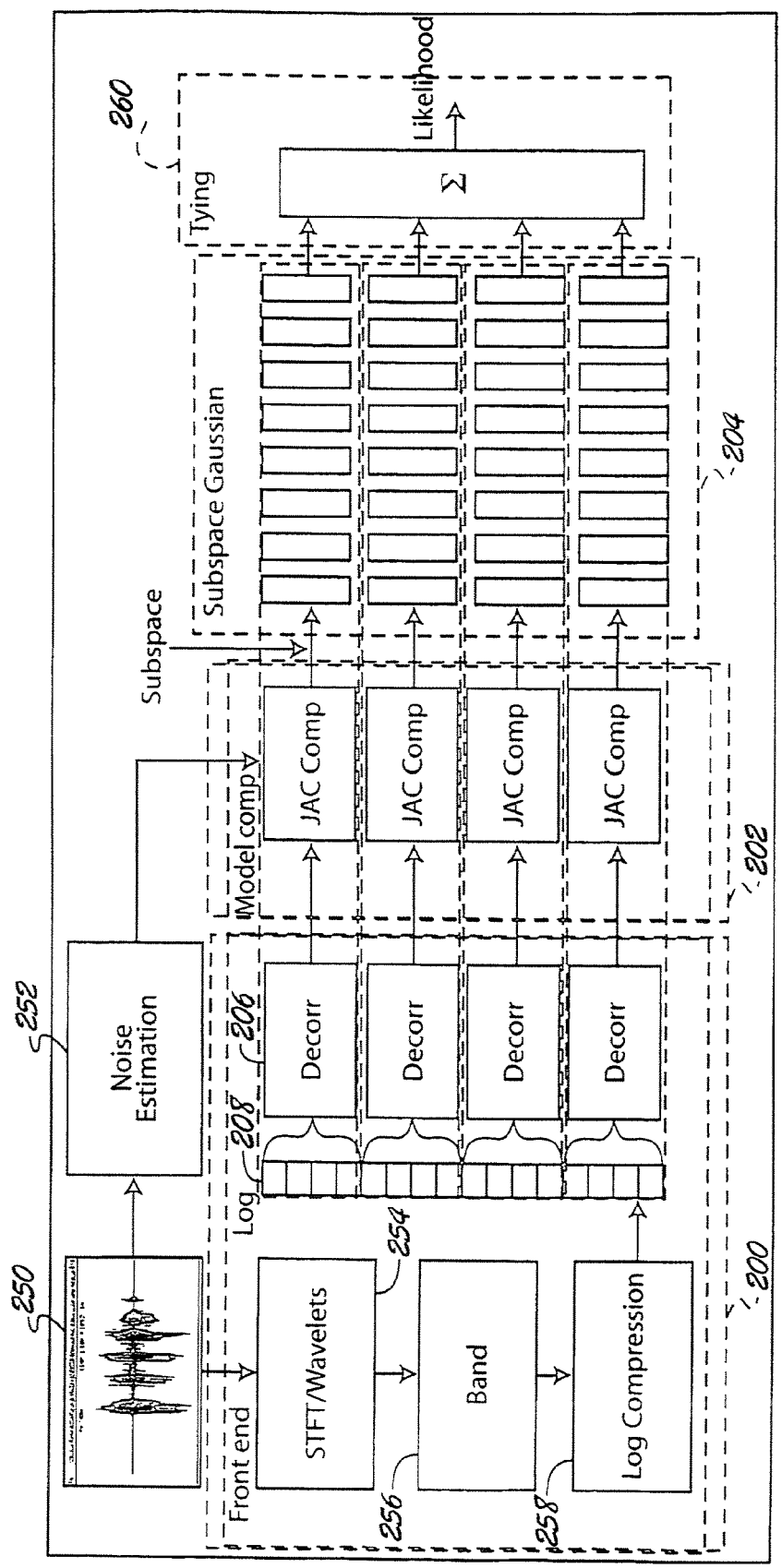
FIG. 2 is a block diagram illustrating real-time implementation of a model compensation distortion function in accordance with the present invention.

Turning to FIG. 2, real-time implementation of a model compensation distortion function in accordance with the present invention includes a number of different components. Such components can include speech input 250, noise estimation 252, power spectral energy estimation by Short Time Fourier Transform (STFT) or Wavelets decomposition 254, band 256, log compression or power-law compression function 258, and tying topology (subspace definition structure) 260. All components in the three main blocks of front-end analysis 200, model-compensation 202, and subspace Gaussian distribution computation 204 are split and aligned to follow the subspace definition structure. The decorrelation matrices 206 operate independently on blocks 208 of log filter-bank energies. This architecture allows for the model-compensation to work effectively on each subspace without affecting the subspace tying structure. This capability allows for efficient model-compensation of subspace compressed acoustic models, which in turn allows a considerable reduction in system size and a considerable improvement in speed.

The model compensation distortion technique of the present invention allows reduction of the acoustic models size by up to $\frac{1}{6}^{th}$ of the initial size, and reduces the computational load to up to $\frac{1}{3}^{rd}$ of the initial while allowing great robustness to noise thanks to the usage of model-compensation. The complexity of the model compensation is also reduced because of the smaller set of distributions to compensate.

Figure 3A:
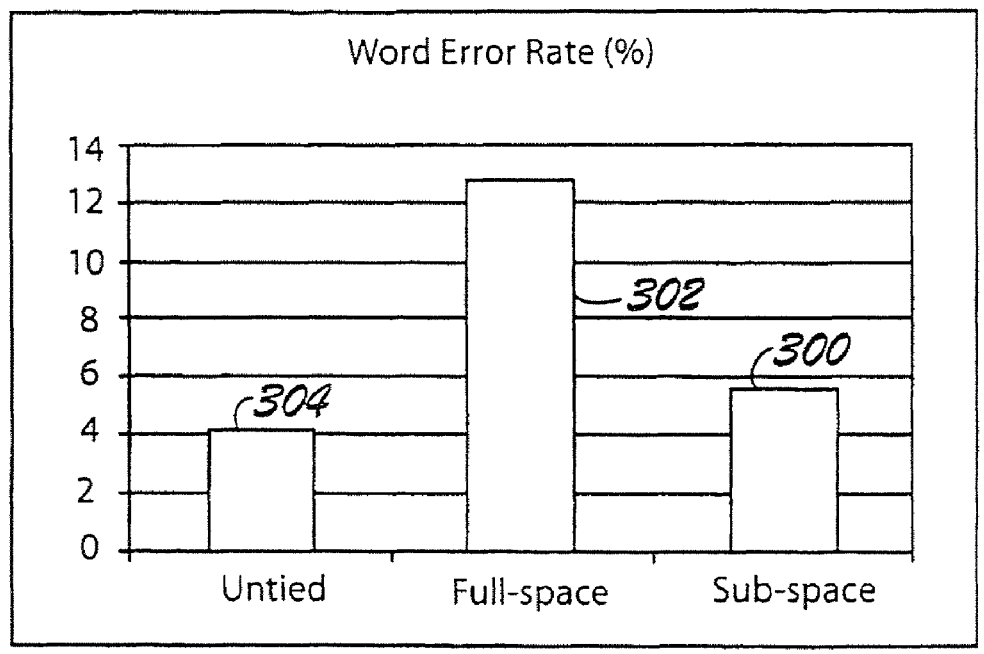
FIG. 3 is a set of graphs illustrating word error rate percentage in FIG. 3A, memory consumption in kilobytes in FIG. 3B, and real time factor in seconds in FIG. 3C.
Figure 3B:
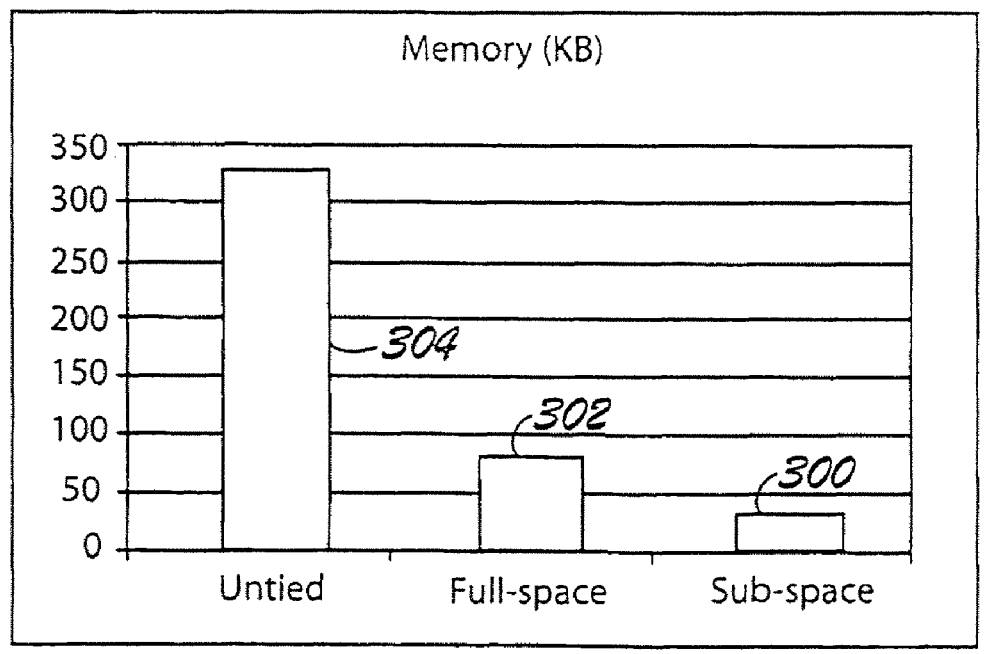
Figure 3C:
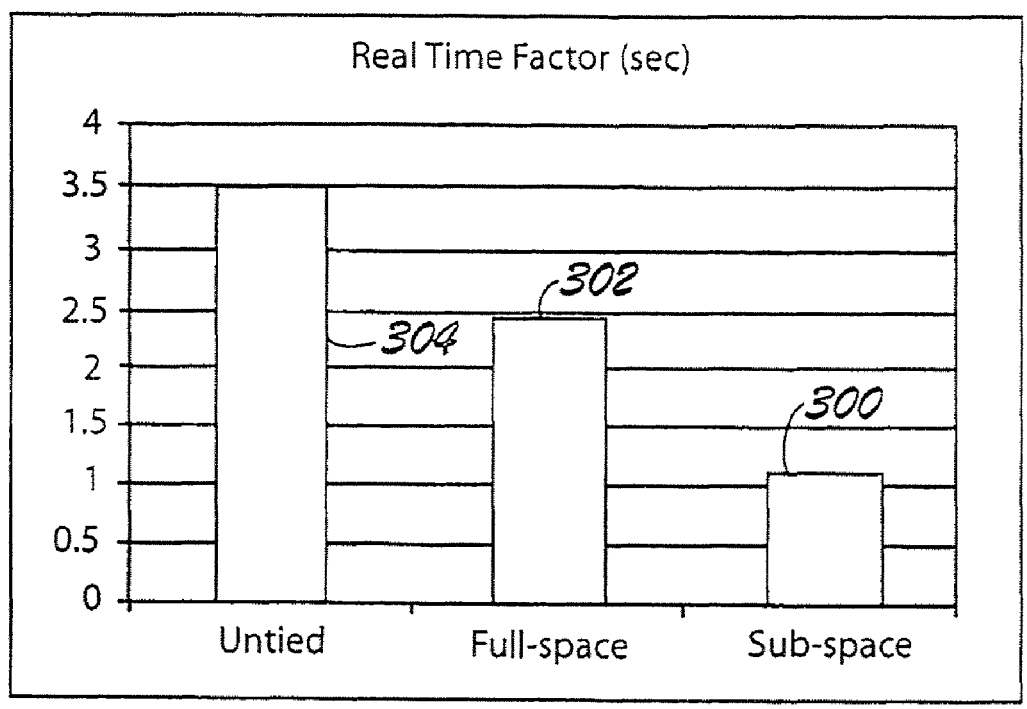

Turning now to FIG. 3, results illustrate performance of the noise robust ASR system according to the present invention for a Car-Navigation task in noisy conditions. Jacobian model compensation is applied in all three cases. The "Sub-space" case 300 shows the performance of the proposed invention. The previous embedded model compression method allowing for model compensation, the "Full-space" case 302, does not provide a good recognition rate, mainly because full-space compression introduces too much distortion in the acoustic models. The proposed method provides better performance, very close to uncompressed models, the "untied" case 304, but with smaller size and a faster real-time factor.

It is envisioned that a similar approach can be employed for speaker adaptation, with subspace transformations (such as MLLR constrained to subspaces). For example, subspace tied acoustic model whitening can be employed with model compensation and an additional subspace tying regarding compensated acoustic models for update purposes (store to RAM or flash ROM, etc.).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A noise robust automatic speech recognition system, comprising:
    a front end analysis module isolating a set of independent subspaces, wherein said front end analysis module employs one or more block diagonal front-end whitening matrices to isolate the set of independent subspaces;
    a model-compensation module employing a model-compensation distortion function that operates on each of the subspaces isolated by said front-end analysis module; and
    a subspace model compression module employing subspace tying to perform model compression.

2. The system of claim 1, wherein the independent subspaces span over different time frames, and the whitening matrices include decorrelation across a 2-dimensional time-frequency axis.

3. The system of claim 2, wherein such 2-D decorrelation matrices are decomposable as discrete cosine transform in frequency domain and time derivative in time domain.

4. The system of claim 1, wherein subspaces corresponding to the block-diagonal whitening matrices in said front end analysis module are constrained to be large enough to allow sufficiently good coverage of a speech signal correlation structure in said front-end analysis module and in said model-compensation module, but small enough to allow a sufficiently low distortion error from subspace tying performed by said subspace model compression module.

5. The system of claim 4, wherein a subspace definition according to size constraints of the subspaces is accomplished by use of an interactive converging algorithm seeking one or more subspace definition solutions that approach optimal combinations of good coverage and low distortion.

6. The system of claim 1, wherein said front end analysis module employs an interactive converging algorithm to determine size constraints of subspaces.

7. The system of claim 6, wherein subspaces in the front-end analysis module are constrained to be large enough to allow coverage of a speech signal correlation structure in said front-end analysis module and in said model-compensation module.

8. The system of claim 6, wherein subspaces in the front-end analysis module are constrained to be small enough to allow a low distortion error from subspace tying.

9. The system of claim 1, wherein all components in said front-end analysis module, model-compensation module, and subspace model compression module are split and aligned to follow a subspace definition structure.

10. The system of claim 9, wherein decorrelation matrices of said front end analysis module operate independently on blocks of log filter-bank energies, thereby allowing for the model-compensation to work effectively on each subspace without affecting the subspace tying structure.

11. The system of claim 1, wherein subspaces in the front-end analysis module are constrained to be large enough to allow coverage of a speech signal correlation structure in said front-end analysis module and in said model-compensation module.

12. The system of claim 1, wherein subspaces in the front-end analysis module are constrained to be small enough to allow a low distortion error from subspace tying.

13. The system of claim 1, wherein subspaces used for the tying are aligned with the independent subspaces isolated by said front end analysis module.

14. The system of claim 1 wherein the model-compensation distortion function is alpha-Jacobian model compensation.

15. The system of claim 1 further comprising a plurality of model-compensation distortion functions, wherein each of the subspaces isolated by said front-end analysis module is operated on by one of the plurality of model compensation distortion functions.

16. A method of operation for use with a noise robust automatic speech recognition system, comprising:
    isolating a set of independent subspaces using a block diagonal front-end whitening matrix;
    using a model compensation module of the speech recognition system that implements a model-compensation distortion function that operates on each of the isolated subspaces; and
    employing subspace tying to perform model compression.

17. The method of claim 16, further comprising constraining subspaces corresponding to the block-diagonal whitening matrix to be large enough to allow sufficiently good coverage of a speech signal correlation structure, but small enough to allow a sufficiently low distortion error from subspace tying.

18. The method of claim 17, further comprising using an interactive converging algorithm to seek one or more subspace definition solutions that approach optimal combinations of good coverage and low distortion in order to accomplish subspace definition according to size constraints of the subspaces.

19. The method of claim 16, further comprising employing an interactive converging algorithm to determine size constraints of subspaces.

20. The method of claim 19, further comprising constraining the subspaces to be large enough to allow coverage of a speech signal correlation structure.

21. The method of claim 19, further comprising constraining the subspaces to be small enough to allow a low distortion error from subspace tying.

22. The method of claim 16, employing front end analysis processes, model-compensation processes, and subspace model compression processes that are split and aligned to follow a subspace definition structure.

23. The method of claim 22, further comprising employing decorrelation matrices that operate independently on blocks of log filter-bank energies, thereby allowing for the model-compensation to work effectively on each subspace without affecting the subspace tying structure.

24. The method of claim 16, further comprising constraining subspaces to be large enough to allow coverage of a speech signal correlation structure.

25. The method of claim 16, further comprising constraining subspaces in the front-end analysis module to be small enough to allow a low distortion error from subspace tying.

26. The method of claim 16, further comprising aligning subspaces used for the tying with the independent subspaces.

27. The method of claim 16, further comprising employing an additional subspace tying regarding compensated acoustic models to perform speaker adaptation.

28. The system of claim 16, wherein the model-compensation distortion function is alpha-Jacobian model compensation.

29. The method of claim 16 further employing a plurality of model-compensation distortion functions, wherein each of the isolated subspaces is operated on by one of the plurality of model compensation distortion functions.

* * * * *

UNITED STATES PATENT AND TRADEMARK OFFICE
CERTIFICATE OF CORRECTION

| | | |
|---|---|---|
| PATENT NO. | : 7,729,909 B2 | Page 1 of 1 |
| APPLICATION NO. | : 11/369938 | |
| DATED | : June 1, 2010 | |
| INVENTOR(S) | : Luca Rigazio et al. | |

It is certified that error appears in the above-identified patent and that said Letters Patent is hereby corrected as shown below:

In column 6, line 15, claim 28, "The system of claim 16," should read -- The method of claim 16, --

Signed and Sealed this

Twenty-first Day of September, 2010

David J. Kappos
*Director of the United States Patent and Trademark Office*